(12) United States Patent
Hunzinger

(10) Patent No.: US 7,133,675 B2
(45) Date of Patent: Nov. 7, 2006

(54) FORWARD LINK BASED RESCUE CHANNEL METHOD AND APPARATUS FOR TELECOMMUNICATION SYSTEMS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 293 days.

(21) Appl. No.: 09/978,974

(22) Filed: Oct. 16, 2001

(65) Prior Publication Data

US 2002/0045443 A1    Apr. 18, 2002

Related U.S. Application Data

(60) Provisional application No. 60/248,900, filed on Nov. 14, 2000, provisional application No. 60/241,268, filed on Oct. 17, 2000.

(51) Int. Cl.
*H04Q 7/20* (2006.01)
*H04Q 7/00* (2006.01)

(52) U.S. Cl. ............... 455/437; 455/436; 455/439; 455/442; 455/443; 455/444; 370/331; 370/328; 370/332

(58) Field of Classification Search ............... 455/421, 455/423, 424, 425, 436, 442, 513, 437, 438, 455/439, 440, 432.1, 422.1; 370/331, 328, 370/332
See application file for complete search history.

(56) References Cited

U.S. PATENT DOCUMENTS

| | | | |
|---|---|---|---|
| 5,081,671 A * | 1/1992 | Raith et al. ............... 455/452.1 |
| 5,267,261 A | 11/1993 | Blakeney, II et al. | |
| 5,301,356 A | 4/1994 | Bodin et al. | |
| 5,353,332 A | 10/1994 | Raith et al. | |
| 5,530,912 A | 6/1996 | Agrawal et al. | |
| 5,640,414 A * | 6/1997 | Blakeney et al. ............ 375/130 |
| 5,673,259 A | 9/1997 | Quick, Jr. et al. | |
| 5,722,044 A | 2/1998 | Padovani et al. | |
| 5,729,826 A | 3/1998 | Gavrilovich | |
| 5,749,055 A | 5/1998 | Dahlin | |
| 5,781,856 A | 7/1998 | Jacobs et al. | |
| 5,884,174 A | 3/1999 | Nagarajan et al. | |
| 5,913,167 A | 6/1999 | Bonta et al. | |
| 5,937,019 A | 8/1999 | Padovani | |

(Continued)

FOREIGN PATENT DOCUMENTS

EP    1 024 606 A2    8/2000

*Primary Examiner*—George Eng
*Assistant Examiner*—Huy Phan
(74) *Attorney, Agent, or Firm*—Morrison & Foerster LLP

(57) ABSTRACT

A forward rescue procedure (FRP) for preventing loss of signal and dropped connections between a mobile station and the infrastructure in a wireless telecommunications network is disclosed. The FRP allows wireless systems to recover from forward link failures at the mobile station that would otherwise result in dropped connections. Examples of failure scenarios that can be overcome using the FRP include forward link Layer 2 acknowledgement failures and loss of forward link signal due to a fade that causes loss of signal for a period of time exceeding a threshold value. In response to a potential connection drop situation, a mobile station will autonomously add base station pilot channels to the active set of its rake receiver in order to rescue the connection in danger of dropping. Concurrently, the wireless network infrastructure will initiate transmission on alternative forward link channels that are likely to be monitored by the mobile station during an FRP. If the same channels are monitored by the MS and transmitted on by the infrastructure, the connection in danger of dropping can be rescued.

8 Claims, 12 Drawing Sheets

U.S. PATENT DOCUMENTS

| | | |
|---|---|---|
| 6,052,594 A | 4/2000 | Chuang et al. |
| 6,061,337 A | 5/2000 | Light et al. |
| 6,104,927 A * | 8/2000 | Willey .................... 455/435.1 |
| 6,161,014 A | 12/2000 | Girardeau et al. |
| 6,233,454 B1 | 5/2001 | Sato |
| 6,236,365 B1 | 5/2001 | LeBlanc et al. |
| 6,253,083 B1 | 6/2001 | Hacena et al. |
| 6,337,983 B1 | 1/2002 | Bonta et al. |
| 6,343,216 B1 * | 1/2002 | Kim et al. ................. 455/450 |
| 6,345,185 B1 * | 2/2002 | Yoon et al. ................ 455/436 |
| 6,360,100 B1 | 3/2002 | Grob et al. |
| 6,445,918 B1 | 9/2002 | Hellander |
| 6,512,927 B1 | 1/2003 | Hunzinger |
| 6,519,457 B1 * | 2/2003 | Jiang et al. ............... 455/442 |
| 6,542,744 B1 * | 4/2003 | Lin ........................... 455/437 |
| 6,567,666 B1 * | 5/2003 | Czaja et al. ............... 455/442 |
| 6,580,919 B1 | 6/2003 | Saito |
| 6,606,343 B1 | 8/2003 | Zeira et al. |
| 6,671,265 B1 * | 12/2003 | Hwang et al. ............. 370/331 |
| 6,674,736 B1 * | 1/2004 | Tiedemann, Jr. ........... 370/332 |
| 2001/0055969 A1 * | 12/2001 | Bonta et al. ............... 455/436 |
| 2002/0034947 A1 * | 3/2002 | Soliman .................... 455/436 |
| 2002/0037726 A1 * | 3/2002 | Czaja et al. ............... 455/442 |
| 2002/0142776 A1 * | 10/2002 | Tiedemann et al. ........ 455/450 |
| 2002/0193113 A1 * | 12/2002 | Sayeedi et al. ............ 455/439 |
| 2003/0002525 A1 * | 1/2003 | Grilli et al. ................ 370/465 |
| 2003/0022630 A1 | 1/2003 | Gandhi et al. |
| 2004/0166865 A1 * | 8/2004 | Soong et al. ............... 455/450 |
| 2004/0233883 A1 * | 11/2004 | Ludwig et al. ............ 370/338 |

* cited by examiner

Forward Link
Pilot Channel(s)
Sync Channel
Paging Channel(s)
Traffic Channels

Reverse Link
Access Channel
Traffic Channel(s)

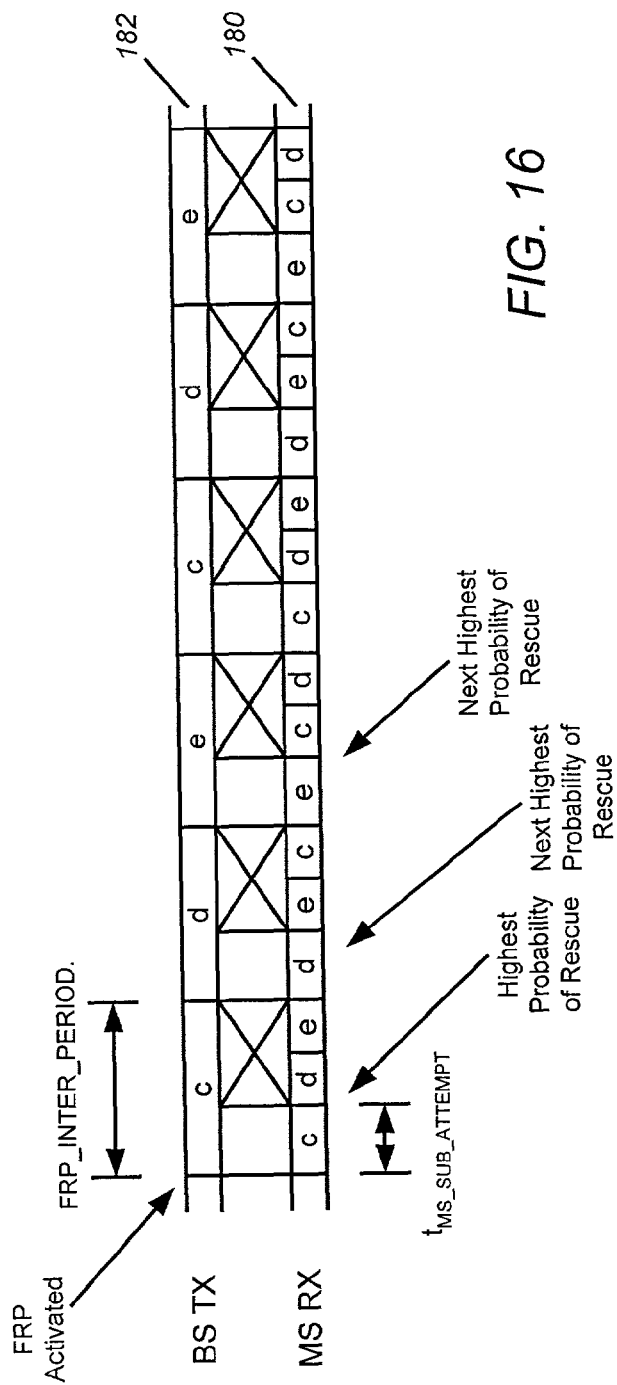

FORWARD LINK BASED RESCUE CHANNEL METHOD AND APPARATUS FOR TELECOMMUNICATION SYSTEMS

CROSS-REFERENCE TO RELATED APPLICATIONS

Embodiments of the present invention claim priority from U.S. provisional patent application Ser. No. 60/241,268 entitled "Forward Rescue Procedure," filed Oct. 17, 2000, and U.S. provisional patent application Ser. No. 60/248,900 entitled "Improvement to Rescue Channels Using Dynamic Active Set During Rescue," filed Nov. 14, 2000, the contents of which are incorporated herein by reference for all purposes.

BACKGROUND OF THE INVENTION

1. Field of the Invention

The present invention relates, generally, to communication network management and, in one embodiment, to methods and apparatus for preventing loss of signal and dropped connections between a mobile station, such as a cellular or PCS phone, and a wireless communication infrastructure (network).

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the forward link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because the term BS is often used to generally identify a transceiver, it should be understood that the terms BS and sector are used herein somewhat interchangeably. The forward and reverse links utilize a number of forward and reverse channels. For example, the BS 26 broadcasts on a plurality of forward channels. These forward channels may include, but are not limited to, one or more pilot channels, a sync channel, one or more paging channels, and multiple forward traffic channels. The pilot, sync, and paging channels are referred to as common channels because the BS 26 communicates those channels to all MSs. Generally, these common channels are not used to carry data, but are used to broadcast and deliver common information. In contrast, the multiple forward traffic channels are referred to as dedicated channels, because each forward traffic channel is intended for a specific MS 24 and may carry data.

Each sector within BS 26 broadcasts a pilot channel that identifies that sector and is simple for a MS 24 to decode. Both sectors and pilot channels are distinguished by pseudo-noise (PN) offsets. The word "pilot" can be used almost interchangeably with the term sector, because a pilot channel identifies a sector.

The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS.

When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message.

In general, each BS may utilize one pilot channel, one sync channel and one paging channel that are common for all MSs to receive. However, because there are practical limitations the number of MSs that can be simultaneously paged using one paging channel, some BSs may employ multiple paging channels.

The reverse channels may include an access channel and one or more reverse traffic channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window. In code division multiple access (CDMA), given a space of frequency and time, each channel is assigned various frequencies at various times, according to a particular Walsh code or quasi-orthogonal function (QOF). The code will define how a particular channel changes over frequency and time. In direct sequence CDMA, the data from each channel is coded using Walsh codes or QOFs and then combined into a composite signal. This composite signal is spread over a wide frequency range at a particular time. When this composite signal is decoded using the same code used to code the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary. However, noise and interference in the field may require error correction to determine what was actually transmitted.

With further reference to CDMA for purposes of illustration only, the Walsh codes or QOFs are used to code a particular channel. Thus, as described above, the simple to decode pilot channel may be the all one coded $W_0$ Walsh code. Similarly, the sync channel may use the alternating polarity $W_{32}$ Walsh code and again, these codes are fixed and known.

Each MS groups the channels into various sets, which may include, but is not limited to, an active set, a neighbor set, a candidate set, and a remaining set.

The MS active set contains the pilots or PN offset identifiers that a MS is utilizing at any point in time. Thus, when a MS is idle, but monitoring a single BS for pages and overhead updates, the active set for that MS will contain that BS pilot or PN offset identifier as its only member.

There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined, the data from a strong channel may be weighted more heavily than data from a weak channel, which is likely to have more errors. Thus, the data with a higher likelihood of being correct is given higher weight in generating the final result.

When a MS is idle, a neighbor set which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value." The neighboring pilot channel information, known in the art as a Neighbor Set, may be communicated to the MS through network infrastructure entities including BS controllers (BSC) 40 that may control a cell cluster 42, or a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes certain pilots from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a BS or network Active Set according to the Pilot Strength Measurement Message, and may notify the MS 36 of the new Active Set via an HDM. It should be noted, however, that the new active set may not always exactly comply with the MS's request, because the network may have BS resource considerations to deal with.

The MS 36 may maintain communication with both the old BS 38 and the new BS so long as the pilots for each BS are stronger than a "pilot drop threshold value." When one of the pilots weakens to less than the pilot drop threshold value, the MS 36 notifies the BSs of the change. The BSs may then determine a new Active Set, and notify the MS 36 of that new Active Set. Upon notification by the BSs, the MS 36 then demotes the weakened pilot to the Neighbor Set. This is one example of a handoff scenario. It is typical for a MS 36 to be starting a handoff or in the process of handoff when connections fail. This is expected because poor coverage or weak signal environments generally exist near cell boundaries, in areas of pilot pollution, or areas significantly affected by cell breathing, all which are well known in the art.

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$ (=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Within each frame 64 is a header area 66, some signaling information 68 and perhaps some data 70. It should be understood that the content of the frames 64 can differ. One frame may contain signaling and data, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate.

In a practical communications network, it is neither realistic nor desirable to target an error rate of zero percent (i.e., all frames received properly). Rather, a frame error rate of one percent, for example, is targeted. Power control loops actually control this frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power and allow the frame error rate to move up to one percent. The BS may therefore continuously instruct the MS, through power control bits in a configuration message, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel. Thus, both the BS and the MS may continuously provide each other feedback in order to change the other's power levels. However, the BS may not necessarily change its transmitter power levels based on the feedback from the MS.

Despite the aforementioned power control loop, error rates may not be controllable to about one percent as a MS moves about in a cellular network and experiences variations in signal strength and signal quality due to physical impediments, interference from adjacent channels, and positions near the edges of sectors, and as the error rates rise to intolerable levels, dropped connections become a problem. Thus, a mechanism is needed to rescue connections in danger of being dropped.

Rescue procedures based on the reverse link or restarting the connection have previously been proposed. In a typical reverse based rescue procedure, the MS transmits a rescue channel while the communications network utilizes one or more sectors in an attempt to demodulate the rescue channel. However, proposed rescue procedures based on restarting the connection utilize the access channel and require a lot of power because the MS is probing, which also introduces a lot of interference. In addition, proposed reverse-based rescue procedures were activated only during a forward fade condition, and are deficient because the MS transmits before the BS, which is less efficient for reasons which will be explained hereinafter.

SUMMARY OF THE INVENTION

One embodiment of the present invention, which will be generally referred to herein as the Forward Rescue Procedure (FRP), is directed to methods and apparatus for preventing loss of signal and dropped connections between a MS, such as a cellular or PCS phone, and a communication infrastructure or network. Examples of failure scenarios that can be overcome using the FRP include forward link Layer 2 (L2) acknowledgement failures and loss of forward link signal due to a fade that causes loss of signal for a period of time exceeding a threshold value. An example embodiment of the present invention involves the ability for a MS to add one or more BS pilot channels, emanating from the communication infrastructure, to the MS's active set in order to preserve a connection in danger of dropping. The BS pilot channels are known as Forward Link Rescue Channels, and shall be referred to herein as Assumed Code Channels (ACCs). Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued. Although the term ACC is most appropriately applied to code division multiple access communication protocols, where a channel is defined by a particular Walsh code or quasi-orthogonal function, it should be understood that the term ACC, as defined herein, encompasses any scheme for defining channels, such as time or frequency slots in TDMA or FDMA, respectively. In particular, implementation and use of the present invention with a code division multiple access (CDMA) wireless communication system, is a preferred embodiment. The CDMA wireless communication system is fully described by the following standards, all or which are published by the TELECOM- MUNICATIONS INDUSTRY ASSOCIATION, Standards & Technology Department, 2500 Wilson Blvd., Arlington, Va. 22201, and all of which are herein incorporated by reference: TIA/EIA-95B, published Feb. 1, 1999; and TIA/EIA/IS-2000, Volumes 1–5, Release A, published Mar. 1, 2000. Other embodiments of the present invention are described in the section entitled "Detailed Description of the Preferred Embodiments." The further implementation of embodiments of this invention with other messaging protocols and data structures and communication systems is straightforward to one skilled in the art.

BRIEF DESCRIPTION OF THE DRAWINGS

FIG. 10 is a timeline illustrating a mobile station cycling through three sectors in an attempt to demodulate a good forward assumed code channel according to an embodiment of the present invention.

FIG. 16 is a timeline illustrating a mobile station cycling through the pilots in its active set and searching for the ACC in those pilots, while a base station is cycling through the pilots in its active set and transmitting the ACC on those pilots according to an embodiment of the present invention.

FIG. 17 illustrates some of the strategies for autonomous pilot demodulation during the rescue procedure period according to an embodiment of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. It should be further understood that although the description provided herein primarily references the CDMA communication protocol for purposes of explanation only, embodiments of the present invention are applicable to other communication protocols and digital radio technologies generally, and include, but are not limited to, CDMA, TDMA, FDMA, GSM, GPRS, and the like.

Summary of Forward Rescue Procedure

The present invention comprises methods and apparatus for preventing loss of signal and dropped connections between a MS and the infrastructure in a telecommunications network. A connection as referred to herein includes, but is not limited to, voice, multimedia video and audio streaming, packet switched data and circuit switched data calls, short message sequences or data bursts, and paging. The invention, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP according to embodiments of the present invention includes a MS FRP, and may also include an infrastructure FRP.

Figure 8:
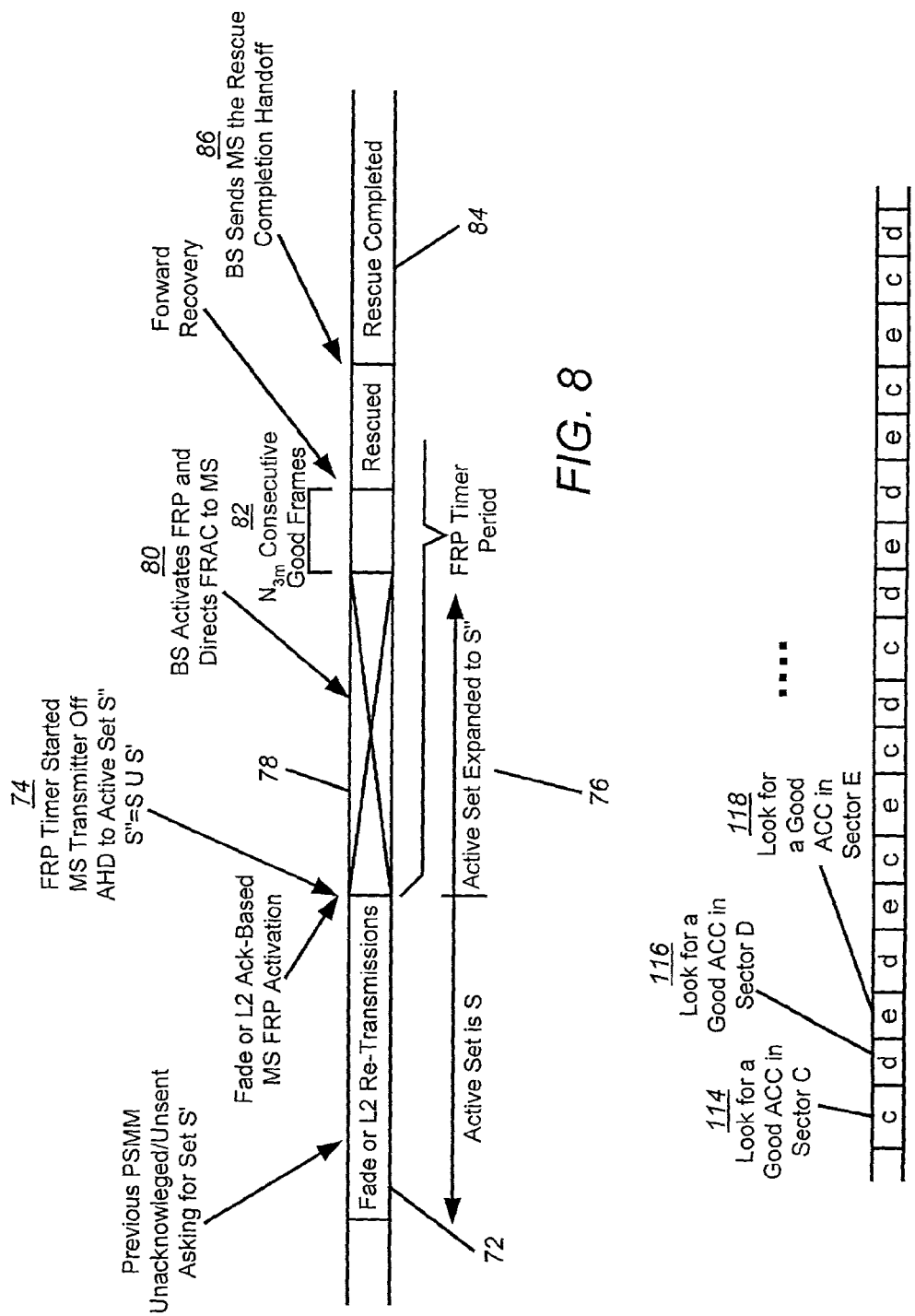
FIG. 8 is a timeline of one embodiment of the present invention wherein the Forward Rescue Procedure is activated and results in the connection not being dropped.

FIG. 8 illustrates an example of the timeline of the MS FRP and infrastructure FRP in a typical connection rescue. As mentioned above, although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM(s) that it has sent (whether or not the PSMM was actually sent, successfully sent, or acknowledged). In other words, the MS promotes pilots to the Active set autonomously without a handoff direction (i.e. the new active set is the union of the old active set and the autonomously promoted active pilots: S"=S U S') (see reference character 76). The MS then begins to cycle through this new Active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the present invention, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages.

Details of the FRP will now be provided in the following paragraphs.

Network Functionality Prior to Rescue

As noted above, prior to any detection of an imminent dropped connection, the MS stores the configuration parameters of the network. In one embodiment, these parameters are fixed values that are simply stored by the MS. There is no need for a overhead message containing these parameters, because the MS would know them already and these parameters would never change. In another embodiment, these configuration parameters may change, and thus the network must send the configuration to the MS in overheads.

Figure 1:
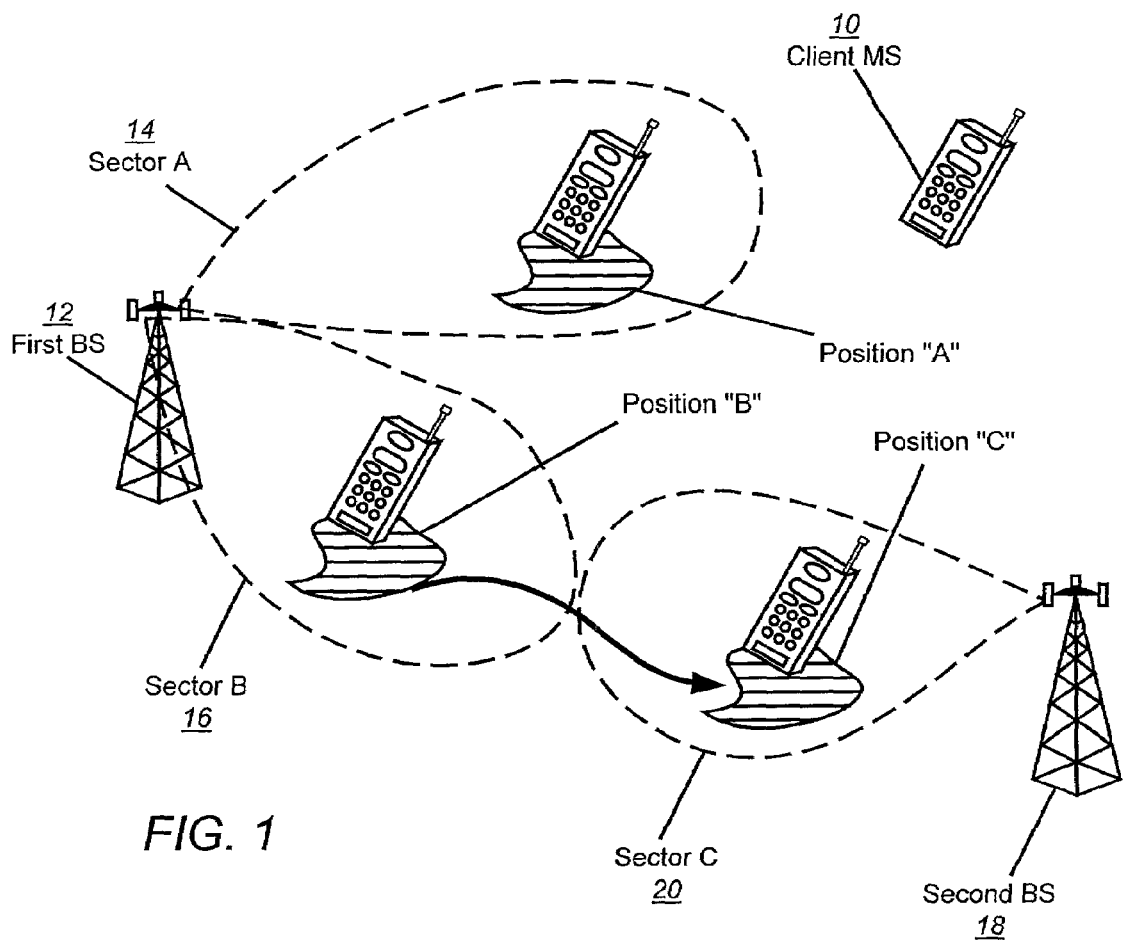
FIG. 1 illustrates a roving mobile station moving amongst different locations between sectors in a wireless communication system.
Figure 2:
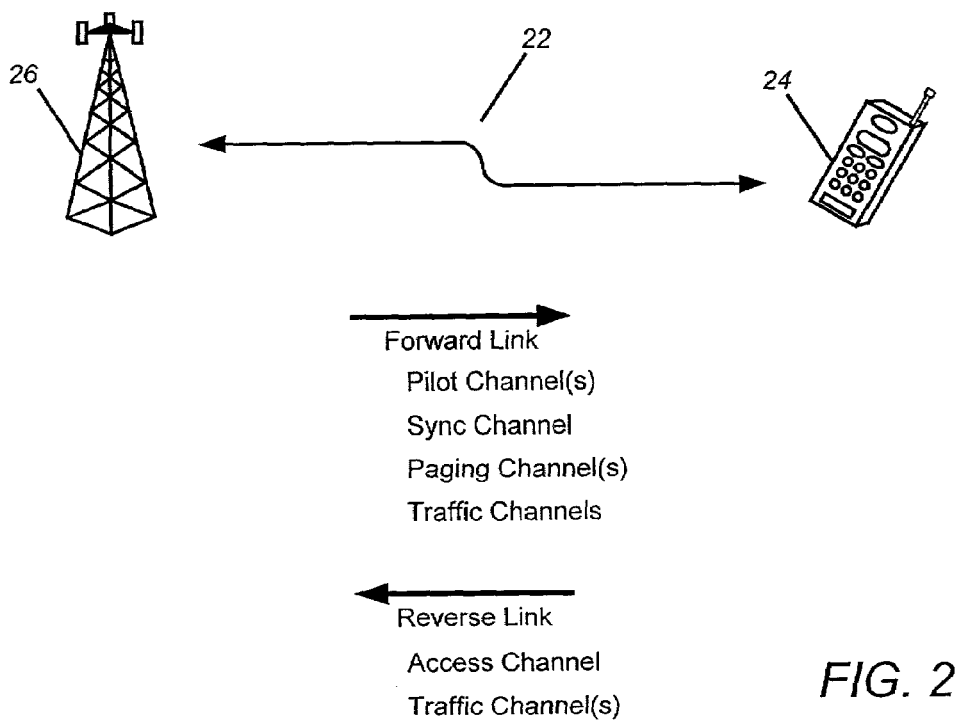
FIG. 2 illustrates an exemplary communication link between a mobile station and a base station in a wireless communication system.
Figure 3:
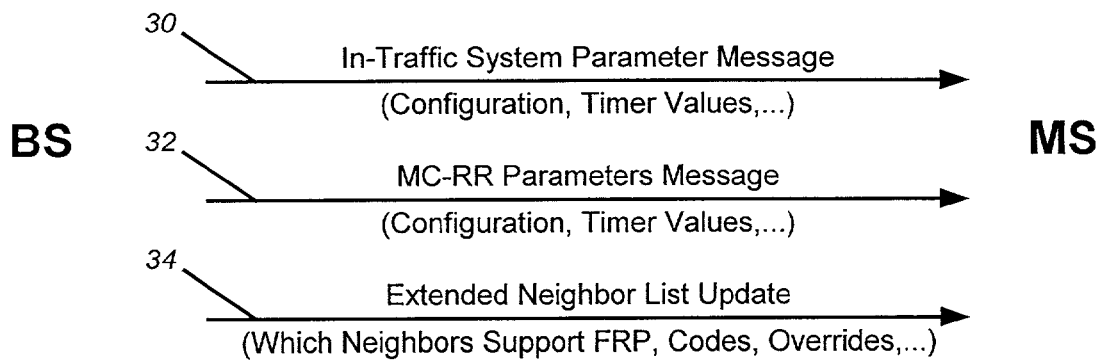
FIG. 3 illustrates overhead messages communicated from a base station to a mobile station in a wireless communication system.

Counterparts to the configuration parameters illustrated in the overhead messages 30, 32 and 34 of FIG. 3 may be sent when the MS is idle. For idle MSs, a common channel may be used to communicate the configuration parameters because all idle MSs need to receive the same information.

MS Forward Rescue Procedure

Figure 9:
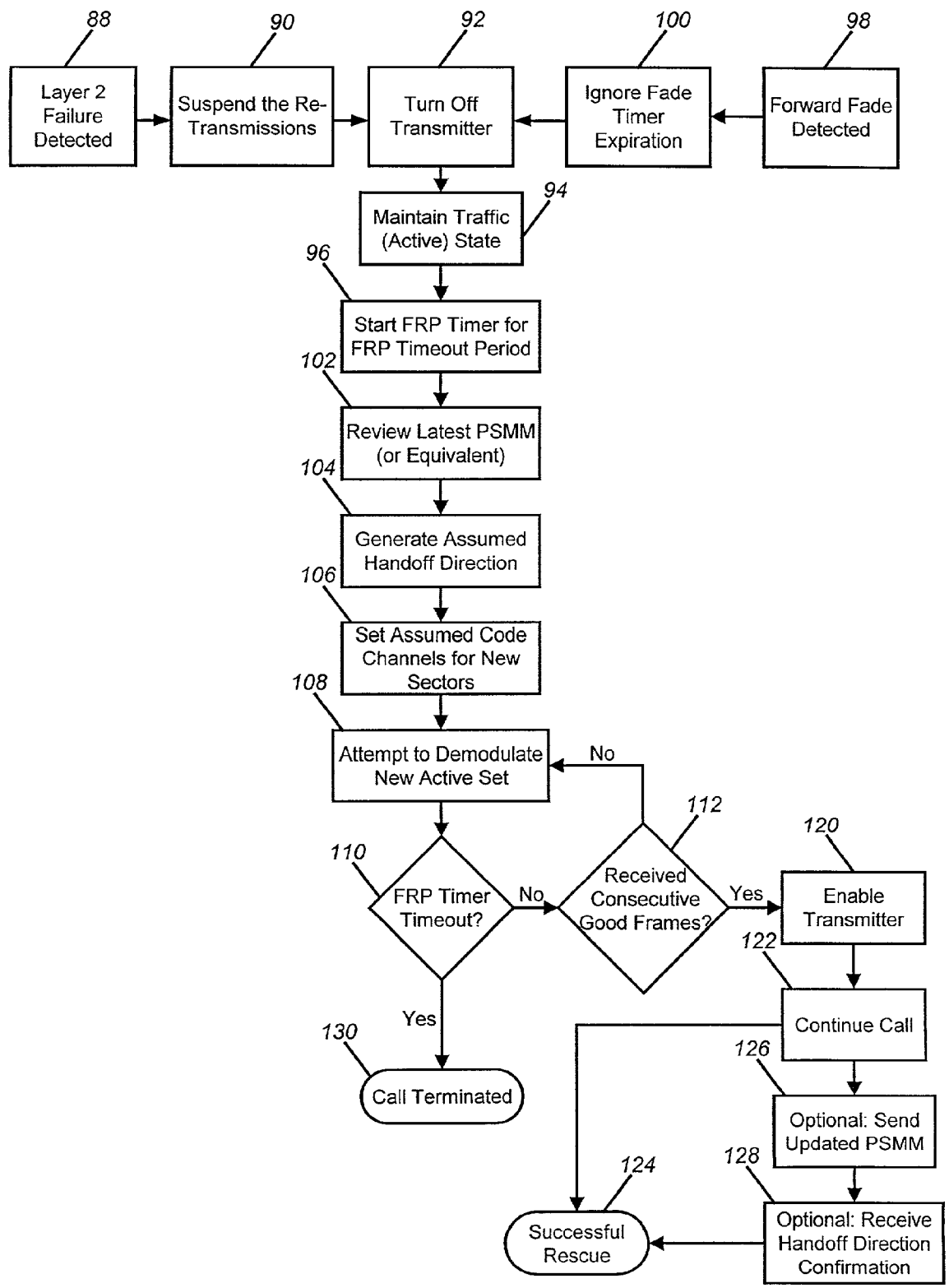
FIG. 9 is a flow diagram for a mobile station procedure according to one embodiment of the present invention.

FIG. 9 is a flowchart of the MS procedure for detecting that a dropped connection is imminent and rescuing that connection according to an embodiment of the present invention.

Figure 5:
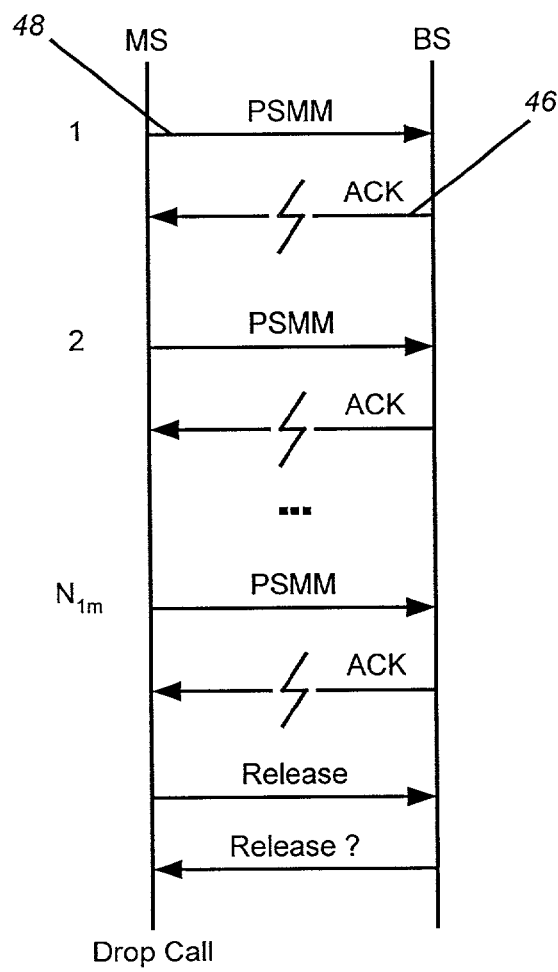
FIG. 5 is a message sequence between a mobile station and a base station resulting in a dropped connection due to Layer 2 Acknowledgement failure.
Figure 4:
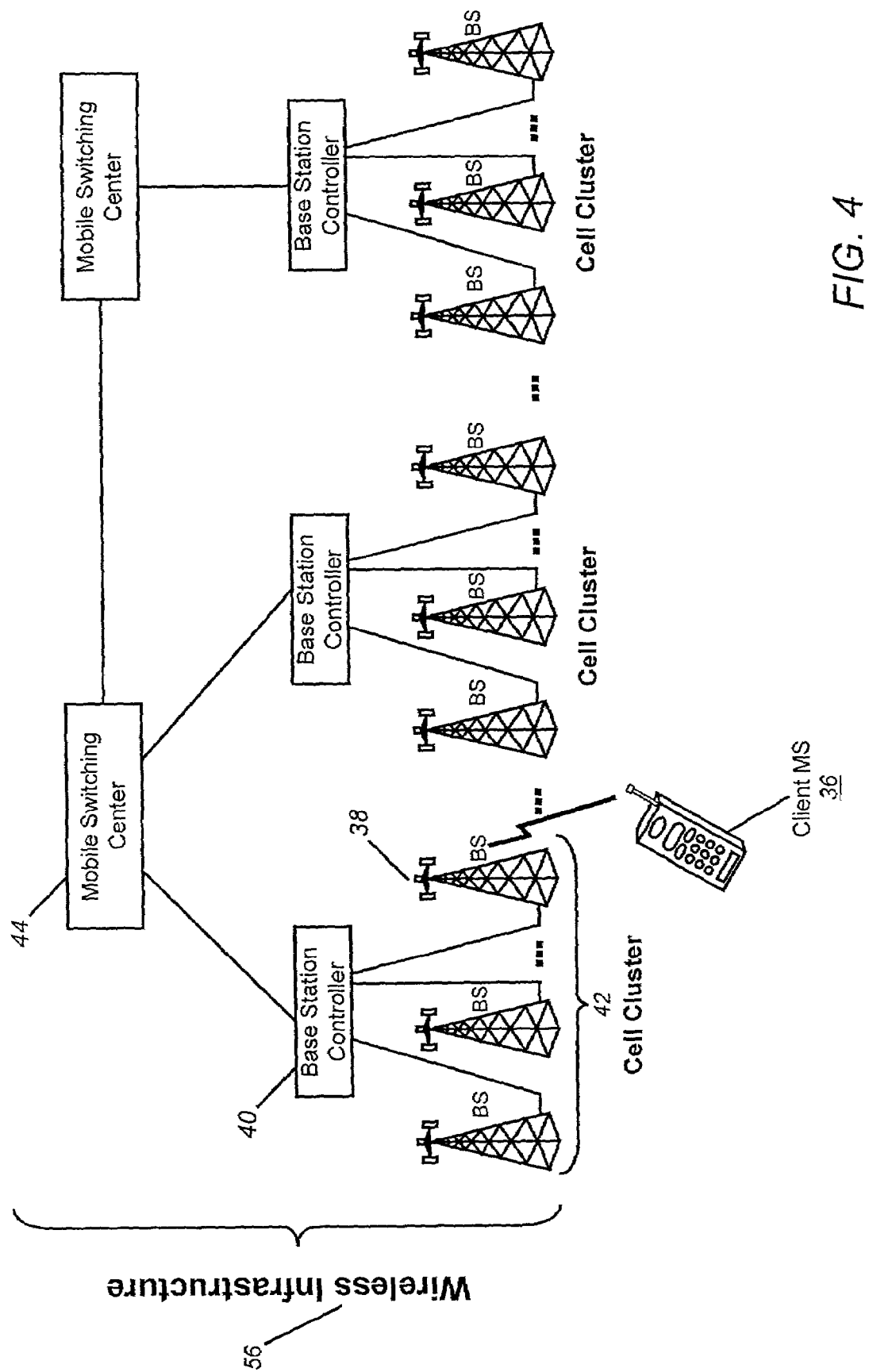
FIG. 4 illustrates a wireless communication infrastructure in communication with a roving mobile station.
Figure 6:
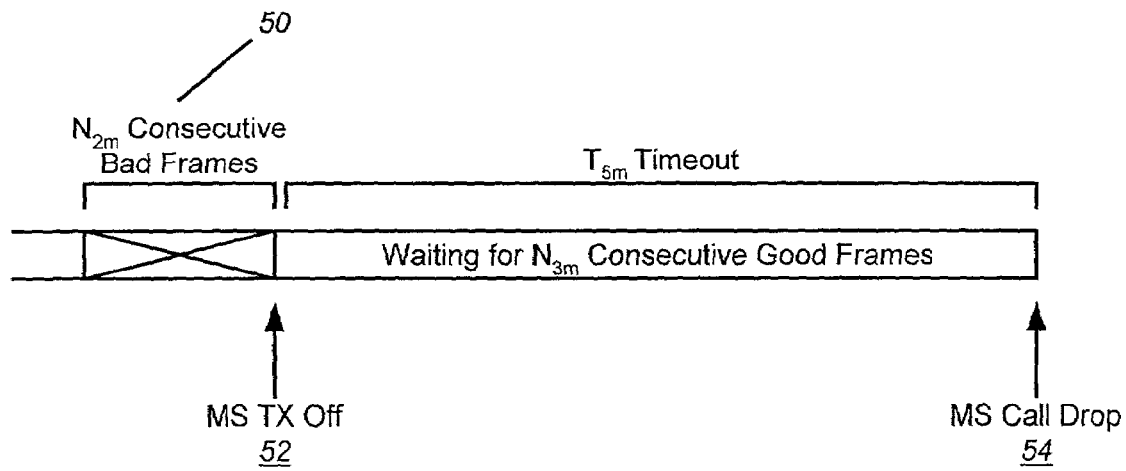
FIG. 6 is a timeline that is representative of a dropped connection resulting from fading of the forward link in a wireless telecommunications network.
Figure 7:
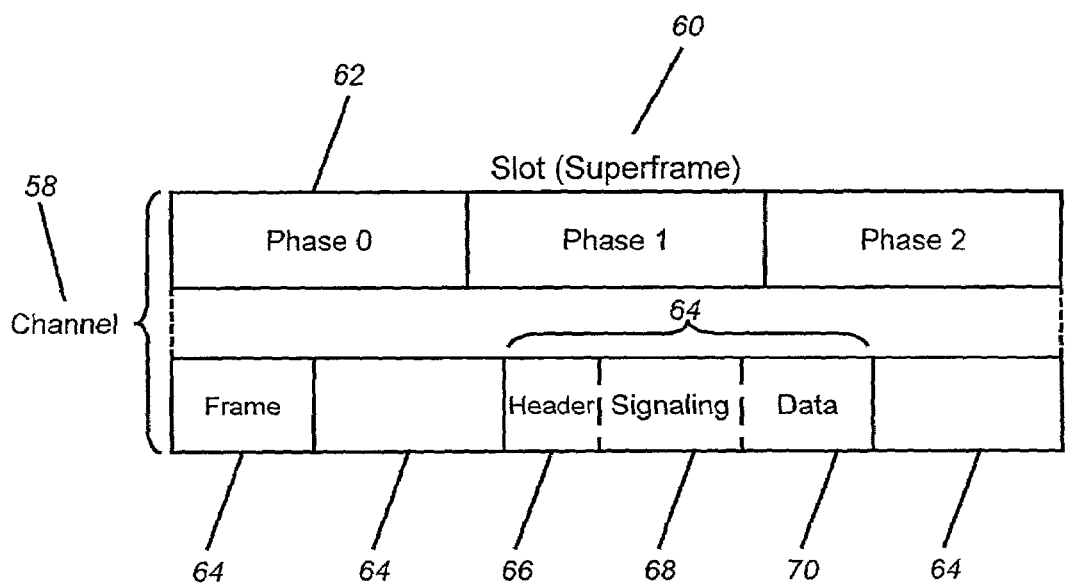
FIG. 7 is a timeline of a slot or superframe, divided into three phases and four frames, for use in a wireless telecommunications network.

When a connection begins to fail, the user of a digital cellular telephone may hear only bits and pieces of a chopped-up conversation or may start experiencing latency or data loss in data connections. In the case of a Forward/Reverse Imbalance illustrated in FIG. 5 in which a Layer 2 Failure occurs (see reference character 88 in FIG. 9), in one embodiment of the present invention the MS determines that a dropped connection is imminent when the MS does not receive a proper acknowledgement to a message sent by the MS, and thereafter performs $N_{1m}$ (=9) failed retransmissions of that message without receiving proper acknowledgement. In one embodiment, this occurs only with respect to failed acknowledgments on Pilot Strength Measurement Messages (PSMMs) or derivatives of such. Note that the variable $N_{1m}$ and other similarly identified variables referred to herein are actually variables defined in the telecommunications standards referred to above. However, embodiments of the present invention are not limited to the values for these variables as defined in the standards.

If the MS does not receive a proper acknowledgement after $N_{1m}$ (=9) retransmissions, without the present invention the MS may finally give up and send a release message to BS. This release message is, in effect, a dropping of the connection. Note that the last release message from the BS to the MS illustrated in FIG. 5 may or may not be transmitted, depending on whether the release message from the MS to the BS was ever received by the BS. Even if the BS receives the release message and sends a release message back to the MS, the MS may never receive it. However, in accordance with an embodiment of the present invention illustrated in the flowchart of FIG. 9, if the MS does not receive proper acknowledgement after $N_{1m}$ (=9) retransmissions, instead of sending a release message, the MS FRP is activated (see reference character 92), an FRP timer is started for the FRP timeout period (see reference character 96), and the MS will temporarily ignore further L2 failures. In other words, the MS will suspend maintenance of the connection by not dropping the connection after a certain period of time. If the FRP timer expires before the rescue is complete, then the connection is dropped. In addition, at the time the rescue attempt is started, the MS suspends retransmissions of the message that failed acknowledgment and any others that are pending (see reference character 90), and turns off the transmitter (see reference character 92). Once the MS's transmitter is turned off, the other user will hear nothing from the MS. However, the MS maintains the traffic channel state. The MS continues all other activities associated with active state (see reference character 94). Note that the MS detection of a Layer 2 Failure, as described above, may be applied to initiate reverse-based rescue procedures as well.

In the case of a Forward Link Fade Failure, a dropped connection may be imminent if there exists a loss of signal ($N_{2m}$ bad frames) for a period of time exceeding a threshold value. When this condition is detected (see reference character 98), the MS turns off its transmitter and a forward MS fade timer ($T_{5m}$) is started. However, the MS maintains the traffic (active) state. Without the present invention, if the fade timer expires before $N_{3M}$ good frames are received, then the connection is dropped. If, on the other hand, the MS does receive $N_{3m}$ consecutive good frames before the fade timer expires, then the MS will turn its transmitter back on and reset the fade timer. In one embodiment of the present invention, at some particular time before the fade timer expires, or when the fade timer expires, the MS FRP will be activated and the FRP timer is started (see reference character 96). It should be understood that the FRP timer may start at the same time that the MS FRP is activated, or after some delay. The FRP Timer could be set equal to or similarly to the forward MS fade timer. The fade timer is thereafter ignored (see reference character 100), and the MS will temporarily ignore further fade failures. In other words, the MS will suspend maintenance of the connection by not dropping the connection after a certain period of time.

Although activation of the MS FRP may be delayed until just before the fade timer expires, one reason for starting the rescue earlier than the expiration of the fade timer is that if the user experiences failing communications for too long a period of time, the user might turn off the MS and manually start a new connection, thereby precluding rescue.

It should be understood that the above-mentioned conditions for starting the MS FRP are merely exemplary, and in other embodiments of the present invention, the conditions for starting the MS FRP may be different.

After the MS FRP is started, in embodiments of the present invention the MS reviews the latest PSMM (and potentially previous PSMMs) (see reference character 102) and adds (promotes) all the pilots in the PSMM(s) that were designated to be promoted to, or maintained in, the active set. Note that the MS is acting on its own at this time because the MS does not send any additional PSMMs to the BS or does not wait for any hand-off directions. This set of pilots forms an Assumed Handoff Direction (AHD) (see reference character 104). Note that the AHD is not actually a message, in that it is not sent or received. Rather, AHD is just a term to describe the MS changes to the active set during the rescue procedure. It should be noted that although the active set may be limited to a particular maximum size during normal operation, in one embodiment of the present invention, during rescue the maximum active set size may temporarily be expanded to accommodate pilots added autonomously during rescue.

After the set of pilots in the AHD have been determined, the MS FRP must determine one or more Assumed Code Channels (ACCs) that the MS will search for within each of the pilots in the AHD. A rescue code defines the ACC. The term "assumed" is used because when the MS searches a pilot for the ACC, the MS is assuming that the pilot is transmitting an ACC defined by the Walsh code or QOF.

The MS FRP can be implemented without invoking an infrastructure FRP as long as the ACC is known a priori by some mechanism. There are a number of ways for determining the ACCs that are not necessarily mutually exclusive. The ACC could be defaulted to be a fixed value specified in the standard. All handoffs could initially be to the default ACC and then, once acknowledged, a second handoff can direct the MS to a non-ACC channel.

The ACC could be specified in overheads per BS, sector, network, or system. Basically, this parameter could be sent in a neighbor list per neighbor, or globally. It could also be sent in one of the parameters message (active or idle) as a global or sector specific FRP ACC. The ACC could be specified in a dedicated message or order, or can be pre-arranged to be a hash of a MS Electronic Serial Number (ESN) or other parameters and BS parameter(s) in order to pseudo-randomly distribute the MS to different channels.

In another embodiment of the present invention, the MS FRP also supports soft reservation of resources. As described earlier, overhead messages are used to transmit certain parameters to the MS. One of the parameters that may be sent in an overhead message is a Walsh code or quasi-orthogonal function that identifies a reserved ACC per BS. This ACC would be different from a normal traffic channel. Soft reservation means that the ACCs may be changed dynamically. This enables the network to more efficiently determine which channels to have available for rescue at any one time, or which Walsh codes to use to define the ACC.

Multiple ACCs may be reserved for rescue. MSs may, for example, hash to different channels. However, it is recommended that few such channels be reserved (preferably only one), for temporary use only. No rescue completion handoff is strictly required. Alternate ACCs may be used or other rescues may be delayed.

A reserved resource is not a strict requirement for this feature because the "reserved" channel may be only used for rescues when it is not otherwise required, for example, as a normal forward resource. No negative impact occurs except that the rescue capability may be temporarily postponed.

After the ACCs are determined, the MS sets the associated code channel to the Assumed Code Channel (ACC) for each active pilot(s) in the new active set (see reference character 106). In one embodiment of the present invention, the MS then attempts to demodulate and monitor the new active set (see reference character 108) by searching for pilot signals and assigning rake fingers to attempt to demodulate a good ACC. Note that at this time the MS is not transmitting anything. The MS continues to attempt to demodulate the new active set until the FRP Timer expires (see reference character 110) or a predetermined number of consecutive good frames are received (see reference character 112).

In one embodiment of the present invention, while performing its search for a good ACC, the MS may only try one sector at a time, or may try several sectors at a time, depending on the rake receiver capability. The MS may attempt to demodulate a good ACC for a set period of time in each sector before moving on to the next sector. In the example of FIG. 10, Sectors C, D and E are the only sectors that are part of the new active set, and thus the MS cycles through these sectors looking for a good ACC (see reference characters 114, 116, and 118).

In one embodiment of the present invention, during the time in which the MS is attempting to demodulate a good ACC from the new active set, the MS will assign rake receiver fingers to multiple pilots. However, during rescue, it may be difficult for the MS to determine which fingers received good frames. The difficulty in determining which channels are providing the good ACC can be illustrated in the following example. Suppose that a MS was originally in communication with BS C in a network comprised of three BSs, A, B and C, but the MS detects that a dropped connection was imminent, and thus initiates the MS FRP. Further suppose that the network also detects the imminent dropped connection and therefore transmits the ACC on BS B. Because the MS does not know which BS is transmitting the ACC, the MS assigns its rake receiver fingers in an attempt to demodulate the ACC from both BS A and BS B. The MS then combines this demodulated information to generate a frame.

If the resulting frame is bad, it could have been due to the channel from BS B not being well received, or that BS A corrupted the demodulated data, or other reasons. Even if the resulting frame is good, the MS may not know which BS transmitted the good ACC. In that case, the MS may then have to try one BS at a time in order to get additional information which will allow it to determine which BS provided the good ACC. Because of this difficulty, in an alternative embodiment of the MS FRP, the MS assigns the rake receiver fingers to only a single channel and sector at one time, and thus if a good ACC is found, the MS will be able to determine which BS provided that good ACC.

Referring again to FIG. 9, if the MS is able to receive a predetermined number of consecutive good frames (e.g., $N_{3m}$ (=2 frames)) before the FRP timer expires, then it enables the transmitter (see reference character 120) and continues the connection (see reference character 122) on the new active set, thereby completing a successful rescue (see reference character 124). The MS should then immediately demote newly assumed active pilots for sectors that it did not receive successfully because these will only introduce interference. The MS may select pilots to demote based on observations of signal strength, symbol combiner weighting, attempts at demodulation of different channels, or responses from the base stations (i.e., HDM).

The MS may also re-construct and send a PSMM based on the current pilot conditions, and reset the retransmission counter and/or fade timer (see reference character 126). The BS may or may not send a handoff direction confirmation (see reference character 128) to complete the recovery and confirm the active set. If the BS does send a handoff direction, the MS needs to update its active set accordingly. If the MS does not receive the predetermined number (e.g., $N_{3m}$ (=2 frames)) of consecutive good frames before the FRP timer expires (see reference character 110), then it terminates (drops) the connection (see reference character 130).

Figure 11:
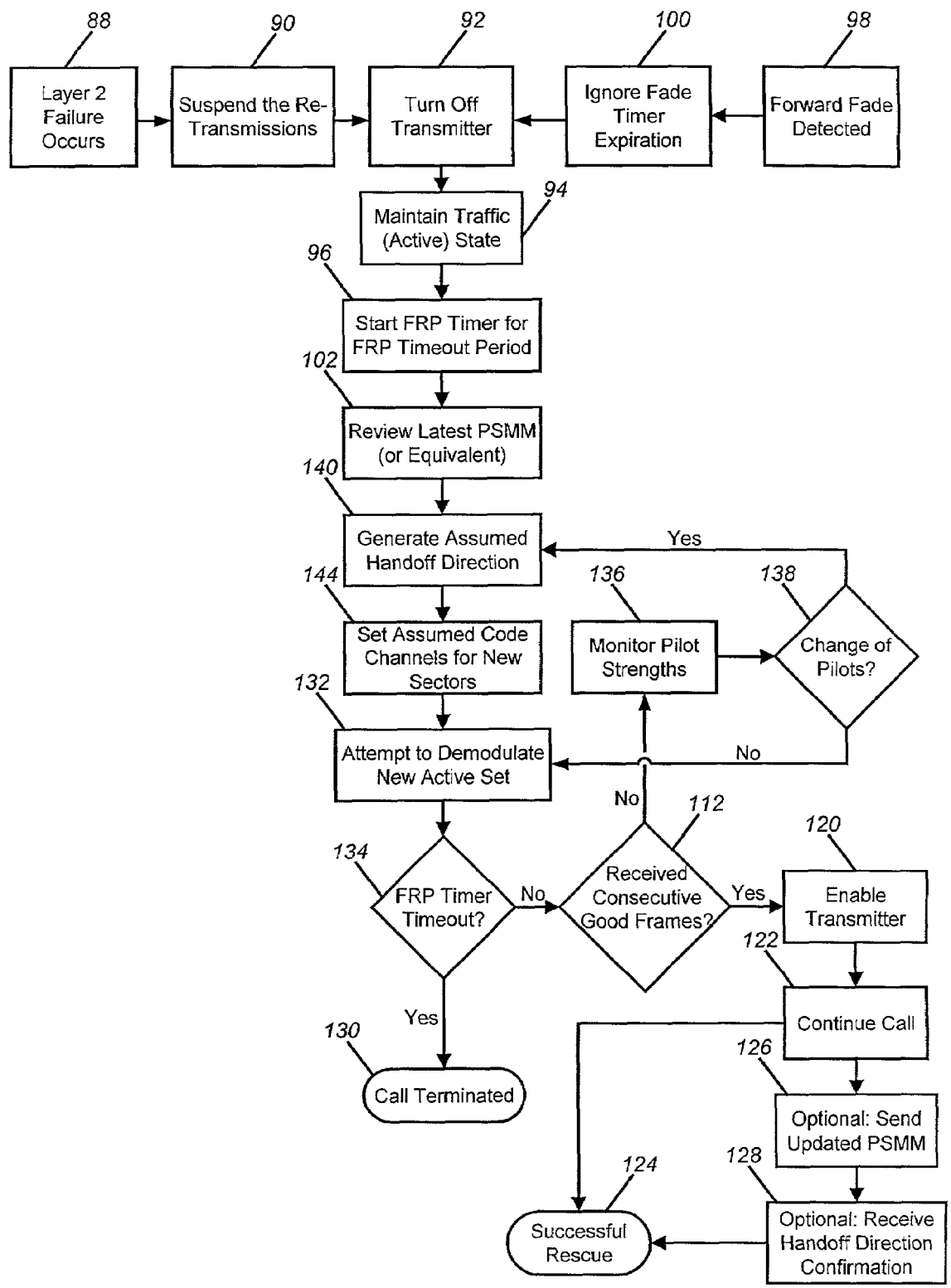
FIG. 11 is a flow diagram of a mobile station procedure including a dynamic active set according to one embodiment of the invention.
Figure 12:
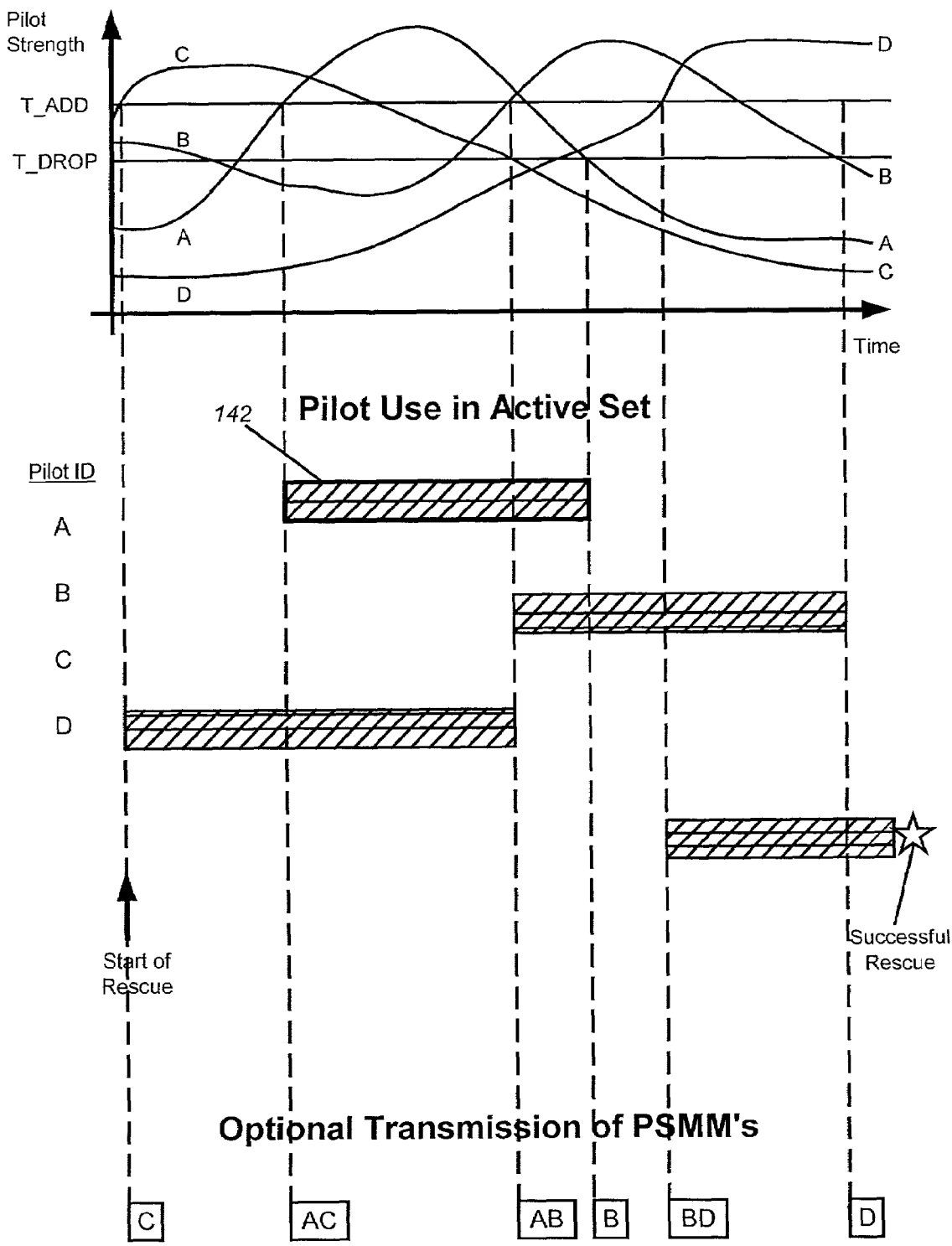
FIG. 12 is a diagram illustrating a mobile station autonomously promoting pilots to the active set when their signal strengths rise above a threshold according to an embodiment of the present invention.

In one embodiment of the present invention, while the MS is attempting to demodulate a good ACC, the MS may autonomously and dynamically change its active set. FIG. 11 is a flowchart of the MS FRP utilizing a dynamic active set. This procedure is similar to FIG. 9 except that the MS may vary the set of sectors that it attempts to demodulate. It does this in order to adapt to changing signal conditions during the rescue and also to attempt to rescue on different sectors and increase the chance of a successful rescue. While the MS is attempting to demodulate the new active set (see reference character 132), but before the FRP Timer expires (see reference character 134), it will monitor other pilot's strengths (see reference character 136) in an attempt to locate new sectors for rescue. If a pilot with sufficient received strength is located and it is not in the current active set (see reference character 138), the MS will add (promote) the new pilot to the AHD (see reference character 140). The MS may also remove (demote) a pilot from the AHD if its strength diminished, or in order to make room for the new pilot. For example, as illustrated in FIG. 12, as part of the MS FRP, pilot signals A, B, C and D are monitored for their signal strength. When a pilot achieves signal strength that is above a threshold T_ADD, the MS will autonomously promote that pilot to both the candidate set and the active set (see, e.g., reference character 142). The MS will create a new active set by autonomously promoting pilots with sufficient strength to the active set.

Referring again to FIG. 11, the MS then sets the code channels associated with the new AHD to the ACC for each particular sector (see reference character 144) and then attempts to demodulate the new active set (see reference character 132). If no new pilots were located (i.e. no change of pilots), the MS will continue to attempt to demodulate the unchanged active set (see reference character 132). If two pilots have the same signal strength, the MS may decide to try both of them in sequence. In embodiments of the present invention, any number of methodologies or intelligent search algorithms well understood by those skilled in the art may be employed by the MS FRP to allow the MS to search for the ACC.

Although the pilots in the original active set of the MS may have initially caused the imminent dropped connection, when looking for a good ACC, the MS may also attempt to locate an ACC in these original pilots, because eventually one of those original pilots may provide the best channel for a rescue. In alternative embodiments of the present invention, all of the members of the new active set, including the old members, can be treated the same way, or the members of the old active set may be treated differently from the new members of the new active set.

In an alternative embodiment of the dynamic active set feature, during rescue the MS may send a new PSMM message each time the MS has changed its active set. In a forward based rescue, this would require that the MS turn its transmitter on for a brief moment in time to transmit this PSMM, while in a reverse based rescue the PSMM would just be sent. The MS will not know for sure that the BS has received this PSMM with the new active set, but if the BS does receive that message, it will help in coordinating the ACC.

It should be understood that this dynamic active set may be applied to both forward and reverse based rescue procedures.

Infrastructure Forward Rescue Procedure

Although it is possible to rescue a connection by implementing only a MS FRP, in other embodiments of the present invention infrastructure FRPs may also be implemented. In these embodiments, during a rescue attempt the MS and infrastructure may continuously monitor pilot conditions and re-seed their respective active sets as necessary with new BSs/sectors. As previously discussed, the MS may continuously monitor existing or new candidates and promote them to the active set using another AHD. Similarly, as will be described, the infrastructure may continuously monitor conditions or the MS's location and direct ACCs on new applicable sectors to the MS. In one embodiment of the present invention, the MS FRP and the infrastructure FRP are activated within 20 milliseconds, or one frame, of each other.

Figure 13:
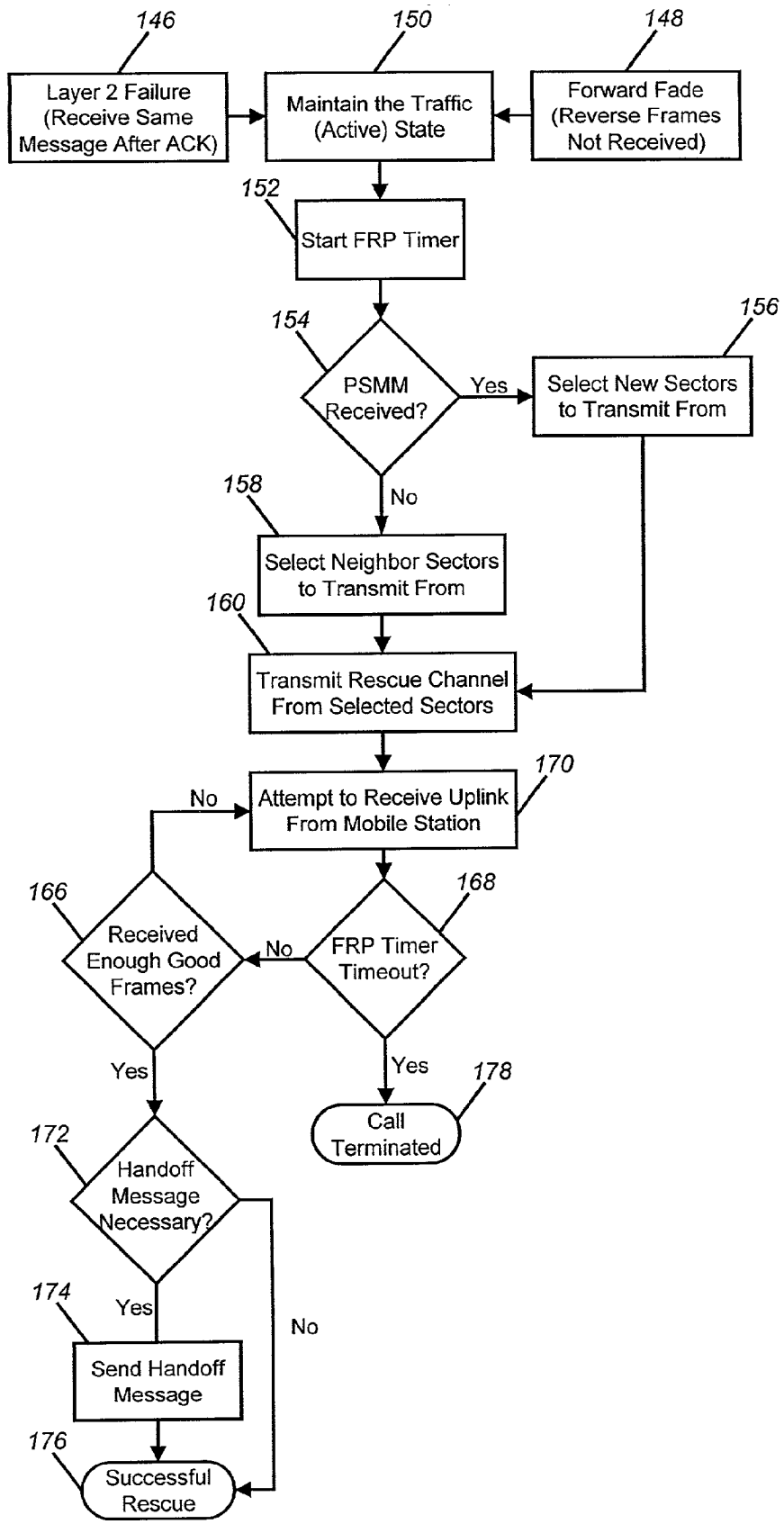
FIG. 13 is a flow diagram of an infrastructure procedure according to one embodiment of the invention.

FIG. 13 is a flowchart of an infrastructure (network) FRP according to an embodiment of the present invention. The infrastructure FRP is similar for both Layer 2 failures and forward fade failures. The infrastructure FRP can be carried out by multiple infrastructure components including, but not limited to, BSs, BS controllers and mobile switching centers. However, for clarity, the infrastructure FRP will be described herein as being performed by a single BS.

The infrastructure FRP is different from the MS FRP because the BS needs to indirectly detect that the MS encountered an imminent dropped connection. A Layer 2 Acknowledgement Failure is more difficult to detect that than a fade condition, because the BS may not know that there's anything wrong. For example, the BS may be receiving every PSMM message that the MS sends to it, and it may be responding to those messages with an acknowledgement message. The BS may note, however, that although it keeps acknowledging the MS's message, the MS continues to retransmit the same message. From this, the BS can infer a forward/reverse imbalance condition in which the MS is having trouble transmitting or receiving. The BS can therefore trigger the infrastructure FRP upon noting FRP Repeat Receive Threshold receipts of the same PSMM (or equivalent) message from the MS after acknowledging each (see reference character 146). Note that the BS detection of a Layer 2 Failure, as described above, may be applied to initiate reverse-based rescue procedures as well.

Another way that the BS can detect an imminent dropped connection is by determining what kind of message is being received from the MS. For example, if the BS repeatedly receives PSMMs from the MS, the BS may examine them and determine that the MS needs a BS or sector other than the one it has. If this PSMM message is sent repeatedly by the MS, that's an indication to the BS that a rescue would be helpful.

The BS can detect that the MS requires rescue for a fade condition by monitoring whether or not the BS received a predetermined number of valid frames from the MS for the fade timer period (see reference character 148). In other words, in a forward fade the MS will stop transmitting, and the BS will be able to detect that after a period of time. Activation of the infrastructure FRP may be favored when the BS either (1) received a PSMM and sent a handoff direction, or (2) sent an acknowledgment during the fade. In either case (see reference character 146 or 148), as shown in FIG. 13, the BS maintains the traffic (active) state (see reference character 150) and starts the FRP timer at the BS (see reference character 152).

As in the Fade Timer advance activation of the MS FRP, the infrastructure FRP may optionally be activated in advance in the case of an L2 Acknowledgement failure by supplying a count that can be deducted from the L2 ACK count (of 9), as a threshold for activation. Additionally, the infrastructure FRP attempt period may be considered limited by the fade timeout. For example, the infrastructure FRP may be initiated only during the latter part of the fade.

As previously described, in an alternative embodiment of the dynamic active set feature, during rescue the MS may send a new PSMM message each time the MS has changed its active set. If a PSMM is received (see reference character 154) by the BS, the BS reviews the received PSMM (see reference character 156). All pilots in the PSMM that were designated to be promoted to, or maintained in, the active set may then be included in the new active set.

If no PSMM was received, a subset of neighbor BSs can be selected (see reference character 158) to be added to the new active set. A BS controller or an infrastructure element knows what the active set was for the MS prior to the start of rescue, and now it must determine additional BSs or sectors to add to the active set in order to rescue the connection. These BSs or sectors to be added are dependent on a number of factors including, but not limited to, the last known active set of the MS, the location of the MS, the sectors closest to the MS, the previous active sets for that MS, other history and statistics of the MS, and what new pilots the MS was asking for. Note that in the case of an L2 acknowledgement failure involving a PSMM, the network may not have to estimate what sector the MS needs, because if the network was able to receive the PSMM, it already knows from the PSMM messages what sector the MS wants. However, if this information is not available, the network uses all of the above-mentioned factors to estimate what sectors the MS may need in order to be rescued. Note also that the network may be able to determine the MS's location not merely because it knows which sector the MS is in, but because the MS may have GPS capability, or the infrastructure may have network-based position location, or the system may have network-assisted position location capability.

In further embodiments of the present invention, during the process of determining additional BSs or sectors to add to the active set in order to rescue the connection, the network will decide if a rescue is possible and desirable. There may be several reasons why a rescue would not be desirable. For example, the sectors needed for rescue may be at capacity and out of bandwidth. In other words, if the infrastructure FRP were to bring up another channel in order to rescue the connection, but in doing so the power and interference in that sector would increase to a point where it would cause another connection utilizing that sector to have forward fade failures, then the FRP hasn't accomplished anything beneficial. Rather, it has merely traded one connection for another. Another reason would be that the sectors are out of codes to assign to an ACC. As described earlier, it is the Walsh codes or the quasi-orthogonal functions which are utilized to open up a new channel. If, within a sector, those codes have all been used up, then a new channel cannot be opened.

The above-mentioned example illustrates one advantage of using a FRP instead of a reverse-based rescue procedure. In the FRP, the BS makes the decision whether or not to try to rescue a connection, and therefore will only open up a new channel and attempt a rescue if it determines that the rescue will not impact other connections. On the other hand, in a reverse-based rescue procedure, the MS will begin transmitting, creating additional power and interference, without knowing if that rescue attempt is going to impact any other existing connections.

After the set of pilots in the new active set have been determined, the infrastructure FRP must determine one or more ACCs that the BSs in the new active set will transmit from each of the pilots in the new active set. As noted above, a Walsh code or QOF defines the ACC.

In embodiments of the present invention, there are a number of options for determining the ACCs that are not necessarily mutually exclusive. The ACC could be defaulted to be a fixed value specified in the standard (i.e. select a reserved forward Walsh code to be used by the ACC). The ACC could be specified in overheads per BS, sector, network, or system. Basically, this parameter could be sent in a neighbor list per neighbor, or globally. It could also be sent in one of the parameters message (active or idle) as a global or sector specific FRP ACC. The ACC could be specified in a dedicated message or order.

In another embodiment of the present invention, the infrastructure FRP also supports soft reservation of resources. As described earlier, overhead messages are used to transmit certain parameters to the MS. One of the parameters that may be sent in an overhead message is a Walsh code or quasi-orthogonal function that identifies a reserved ACC. This ACC would be different from a normal traffic channel. Soft reservation means that the ACCs may be changed dynamically. This enables the network to more efficiently determine which channels to have available for rescue at any one time, or which Walsh codes to use to define the ACC.

Multiple ACCs may be reserved for rescue. However, it is recommended that few such channels be reserved (preferably only one), for temporary use only. No rescue completion handoff is strictly required. Alternate ACCs may be used or other rescues may be delayed.

A reserved resource is not a strict requirement for this feature because the "reserved" channel may be only used for rescues when it is not otherwise required, for example, as a normal forward resource. No negative impact occurs except that the rescue capability may be temporarily postponed.

Once the new active set and the ACC has been determined, the BSs in the new active set will then transmit the forward link for the MS using the associated (agreed upon) ACC(s) (see reference character 160). In other words, additional ACCs are made available for the MS to soft-handoff with. These ACCs are transmitted on one or more sectors that the MS did not have when the connection was first failing.

Figure 14:
FIG. 14 is a timeline illustrating a base station cycling through three sectors while transmitting on the forward assumed code channel from each sector according to an embodiment of the present invention.

In one embodiment of the present invention, only one sector will transmit on the ACC at any one time. Transmitting from only one sector provides an advantage of minimizing the capacity impact of a rescue, because in a forward rescue, the network knows its traffic and capacity and can coordinate within itself where and when to transmit the ACC. As illustrated in the example of FIG. 14, the sector will transmit on the ACC for only a set period of time 162 before it will stop and another sector will transmit, as the network cycles through its set of sectors.

Figure 15:
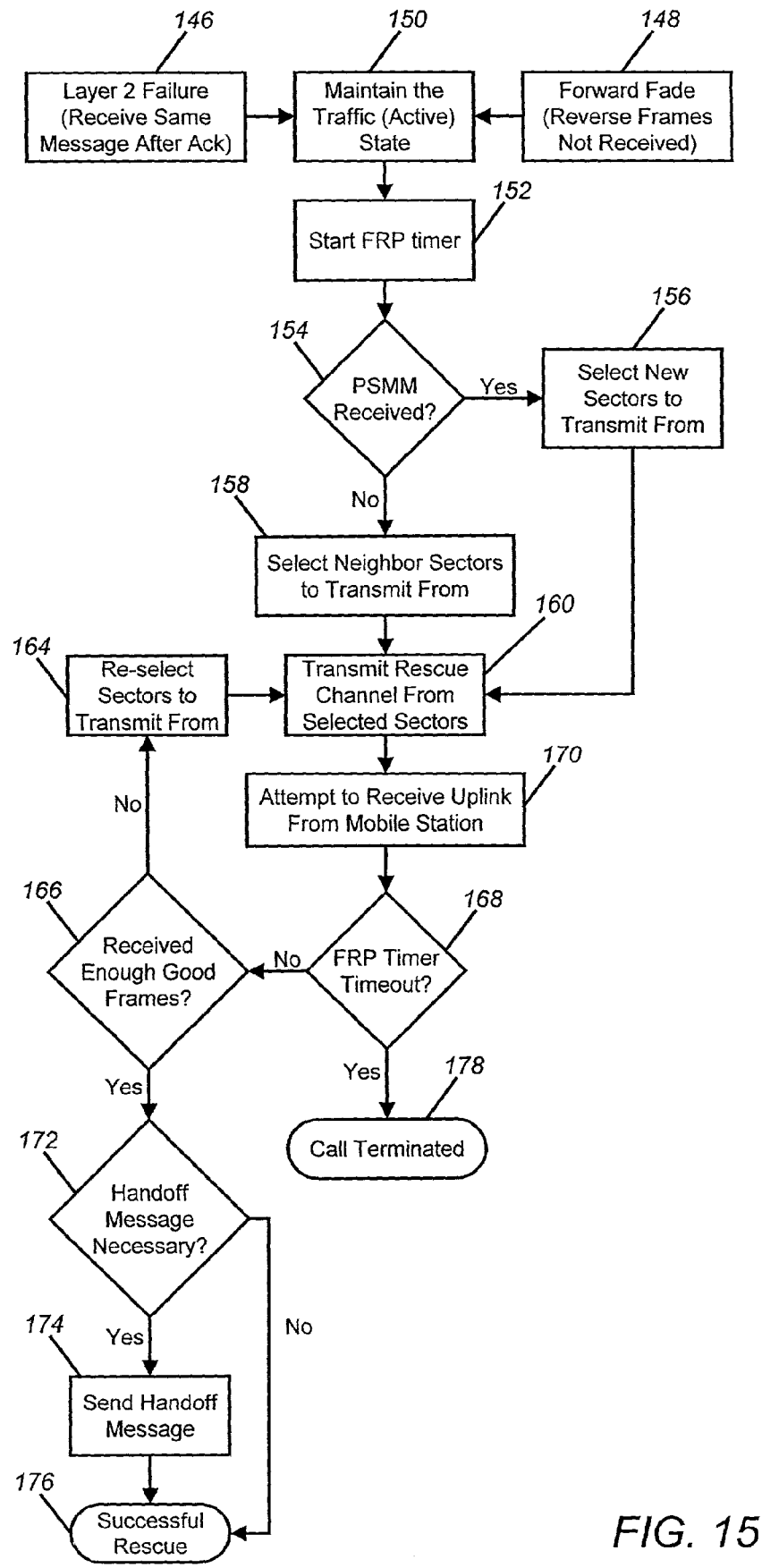
FIG. 15 is a flow diagram of an infrastructure procedure including a dynamic sector selection according to one embodiment of the invention.

However, in other embodiments, multiple sectors or BSs may transmit the ACC at the same time. FIG. 15 is a flowchart illustrating an infrastructure FRP which includes a dynamic selection of sectors from which to transmit ACCs. The infrastructure may select different BS sectors (see reference character 164) depending on signal condition changes, MS reactions, or to attempt different combinations of sectors to rescue. The reselection of sectors takes place if the BS has not received a predetermined number of consecutive good frames (see reference character 166) and if the FRP Timer has not expired (see reference character 168). The network may alternate between sectors to maximize the chance of rescuing the MS while minimizing resource usage.

Optionally, the BS may operate the ACC channels in a slotted or burst/intermittent mode where it transmits at least a predetermined number ($N_{3m}$) of forward frames during any FRP Timer (value) period so that a MS has a chance to be rescued. At the same time, this minimizes interference and maximizes capacity. The ACC may also be turned off when there are no connections up that are at risk (i.e. a weak signal or at near high power on neighboring BSs/sectors).

After the BS activates the new rescue traffic channels, the BS will attempt to receive the up-link from the MS (see reference character 170). Because the sectors transmit first, the MS will transmit only after recognizing the BS is attempting the rescue, minimizing power and interference.

As described above, in the MS FRP the MS reviews the latest PSMM (and potentially previous PSMMs) and may add (promote) all the pilots in the PSMM(s) that were designated to be promoted to, or maintained in, the active set. Similarly, the infrastructure FRP may use received PSMMs to determine which pilots to add to its active set, and may base this determination on signal strength. In addition, if the infrastructure FRP is activated, neighbor BSs may be added to the active set maintained by the infrastructure. Note that both the MS and infrastructure FRPs are acting autonomously at this time, and therefore neither knows the new active set of the other. Under these circumstances, in embodiments of the present invention illustrated in the example of FIG. 16, the MS FRP will cycle through the pilots in its new active set (see reference character 180), searching for the ACC in those pilots. At the same time, the infrastructure FRP will cycle through the pilots in its new active set (see reference character 182), transmitting the ACC on those pilots. FIG. 17 illustrates some of the strategies for autonomous pilot demodulation and transmission during the rescue procedure period. This cycling of pilots by the MS and the infrastructure FRPs is preferably coordinated according to a certain set of strategies to guarantee some transmission overlap for at least $N_{3m}$ frames, and therefore permit a rescue. At this time of transmission overlap, the MS will be attempting to demodulate the ACC from a particular sector at the same time that the network is transmitting the ACC on that sector.

Referring again to FIG. 15, if the BS is able to receive a predetermined number of consecutive good frames on the up-link before the FRP timer expires (see reference character 168), then it may send a Rescue Completion Handoff (RCH) message (see reference characters 172 and 174) to the MS to confirm and complete the recovery (see reference character 176). The RCH reassigns the MS to a different Code Channel for that BS so that the ACC may be re-used to rescue other MSs. The BS sends this message to the MS as soon as possible. The network can then update its active set according to the active set transmitted by the MS and continue the connection.

If the BS does not receive the predetermined number of consecutive good frames on the up-link before the FRP timer expires, then the connection is terminated (dropped) (see reference character 178).

Applications of Forward Rescue Procedure

Although the general FRP was described hereinabove using a CDMA cellular network as an example, the basic concepts of rescuing a connection in danger of being dropped, forward and multiple reverse links, overhead messages, dedicated and common channels, and ACCs described in the general FRP are applicable to or may be extended to other wireless protocols and technologies such as paging systems, satellite communication systems, cordless phone systems, fleet communication systems, and the like. For example, both CDMA and TDMA utilize the concept of channels. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, and the like.

The key building blocks of the FRP include: (1) one or more terminals that are in danger of having, or have, a failing connection, (2) an entity that has some control over one or more terminals that starts rescuing by transmitting while the terminal(s) listen for the rescue, and (3) those terminals start transmitting back to the entity upon successfully receiving the transmission from that entity.

The terminals could be wireless for use in commercial, military or other applications including under-water use, use in space, or between satellites and ground stations or terminals such as Globalstar™ or Iridium™-type systems. The terminals could also be connected to the entity via shared wireline such as Ethernet. In this case, a terminal that has a failing connection would stop transmitting and wait until it receives a rescue transmission addressed to it from the entity.

In the broader application, a controlling entity has control over the rescue because it decides when to rescue a terminal and which terminal(s) to rescue. In this sense, the procedure is centralized and thus overcomes the efficiency, delay, and power control type problems associated with decentralized procedures.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a mobile station (MS), a method for continuing a connection between the MS and a network, comprising:

detecting an acknowledgement failure, wherein the acknowledgement failure is detected when the MS has not received an acknowledgement to a message sent by the MS after a certain number of retransmissions of the message by the MS;

disabling a transmitter of the MS when the acknowledgement failure is detected; and initiating a call rescue handoff after disabling the transmitter;

wherein the call rescue handoff includes
   autonomously adding a pilot corresponding to a rescue channel to an active set of the MS,
   enabling the transmitter after adding the pilot to the active set,
   monitoring the rescue channel for good frames, and
   continuing the connection when the good frames are received; and
wherein the acknowledgement failure is determined by detecting a Layer 2 acknowledgement failure.

2. The method of claim 1, wherein the autonomously adding step is carried out without receiving a handoff direction message instructing a changing of the pilot in the active set from the network.

3. The method of claim 2, wherein the autonomously adding step is carried out before transmitting a pilot strength measurement message to the network after disabling the transmitter.

4. The method of claim 1, wherein the autonomously adding step adds a pilot that has not been specified in a handoff direction message instructing a changing of the pilot in the active set.

5. In a mobile station (MS), a method for continuing a connection between the MS and a network, comprising:
   detecting an acknowledgement failure, wherein the acknowledgement failure is detected when the MS has not received an acknowledgement to a message sent by the MS after a certain number of retransmissions of the message by the MS;
   autonomously adding a pilot corresponding to a rescue channel to an active set of the MS when the acknowledgement failure is detected;
   monitoring the rescue channel for good frames; and
   continuing the connection over the rescue channel when the good frames are received via the rescue channel;
   wherein the acknowledgement failure is detected by detecting a Layer 2 acknowledgement failure.

6. The method of claim 5, wherein the autonomously adding step is carried out without receiving a handoff direction message instructing a changing of the pilot in the active set from the network.

7. The method of claim 6, wherein the autonomously adding step is carried out before transmitting a pilot strength measurement message to the network after disabling the transmitter.

8. The method of claim 5, wherein the autonomously adding step adds a pilot that has not been specified in a handoff direction message instructing a changing of the pilot in the active set.

* * * * *